(12) United States Patent
Liang et al.

(10) Patent No.: US 10,718,166 B2
(45) Date of Patent: Jul. 21, 2020

(54) LASER-LEACHED POLYCRYSTALLINE DIAMOND AND LASER-LEACHING METHODS AND DEVICES

(71) Applicant: Halliburton Energy Services, Inc., Houston, TX (US)

(72) Inventors: Qi Liang, Richmond, VA (US); William Brian Atkins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 140 days.

(21) Appl. No.: 15/312,286

(22) PCT Filed: Jun. 17, 2015

(86) PCT No.: PCT/US2015/036163
§ 371 (c)(1),
(2) Date: Nov. 18, 2016

(87) PCT Pub. No.: WO2015/195754
PCT Pub. Date: Dec. 23, 2015

(65) Prior Publication Data
US 2017/0088427 A1    Mar. 30, 2017

Related U.S. Application Data

(60) Provisional application No. 62/015,219, filed on Jun. 20, 2014.

(51) Int. Cl.
*E21B 10/567* (2006.01)
*B23K 26/08* (2014.01)
(Continued)

(52) U.S. Cl.
CPC ........ *E21B 10/567* (2013.01); *B23K 26/0823* (2013.01); *B23K 26/0853* (2013.01);
(Continued)

(58) Field of Classification Search
None
See application file for complete search history.

(56) References Cited

U.S. PATENT DOCUMENTS 5,057,184 A    10/1991    Gupta et al.
6,004,505 A    12/1999    Roy et al.
(Continued)

FOREIGN PATENT DOCUMENTS

CN    102281974    12/2011
CN    103608544    2/2014
(Continued)

OTHER PUBLICATIONS

International Search Report and Written Opinion, Application No. PCT/US2015/036163; 15 pgs., dated Sep. 1, 2015.
(Continued)

*Primary Examiner* — Colleen P Dunn
*Assistant Examiner* — Ross J Christie
(74) *Attorney, Agent, or Firm* — Baker Botts L.L.P.

(57) ABSTRACT

The present disclosure relates to methods of laser-leaching polycrystalline diamond (PCD), devices for performing such methods, and to laser-leached PCD and elements and drill bits containing laser-leached PCD.

18 Claims, 4 Drawing Sheets

(51) Int. Cl.
    *B23K 26/70*    (2014.01)
    *B23K 26/12*    (2014.01)
    *B23K 26/352*   (2014.01)
    *C01B 32/28*    (2017.01)
    *B24D 3/10*     (2006.01)
    *B23K 103/00*   (2006.01)

(52) U.S. Cl.
    CPC ........ *B23K 26/127* (2013.01); *B23K 26/1224* (2015.10); *B23K 26/352* (2015.10); *B23K 26/702* (2015.10); *B24D 3/10* (2013.01); *C01B 32/28* (2017.08); *B23K 2103/30* (2018.08); *C01P 2006/80* (2013.01)

(56) References Cited

U.S. PATENT DOCUMENTS

| | | | |
|---|---|---|---|
| 6,365,230 | B1 | 4/2002 | Baik et al. |
| 6,797,326 | B2 | 9/2004 | Griffin et al. |
| 7,407,012 | B2 | 8/2008 | Keshavan et al. |
| 7,487,849 | B2 | 2/2009 | Radtke |
| 7,533,740 | B2 | 5/2009 | Zhang et al. |
| 7,543,662 | B2 | 6/2009 | Belnap et al. |
| 7,628,234 | B2 | 12/2009 | Middlemiss |
| 7,635,035 | B1 | 12/2009 | Bertagnolli et al. |
| 7,712,553 | B2 | 5/2010 | Shamburger |
| 7,845,438 | B1 | 12/2010 | Vail et al. |
| 7,972,395 | B1 | 7/2011 | Dadson |
| 8,002,859 | B2 | 8/2011 | Griffo et al. |
| 8,066,087 | B2 | 11/2011 | Griffo et al. |
| 8,535,400 | B2 | 9/2013 | Belnap et al. |
| 8,567,531 | B2 | 10/2013 | Belnap et al. |
| 8,573,332 | B2 | 11/2013 | Scott |
| 8,590,130 | B2 | 11/2013 | Zhang et al. |
| 9,254,554 | B1* | 2/2016 | Bertagnolli ............... B01J 3/062 |
| 2007/0144790 | A1 | 6/2007 | Fang et al. |
| 2007/0169419 | A1 | 7/2007 | Davis et al. |
| 2008/0302579 | A1 | 12/2008 | Keshavan et al. |
| 2010/0181117 | A1* | 7/2010 | Scott ....................... C04B 35/52 |
| | | | 51/307 |
| 2010/0300764 | A1 | 12/2010 | Naidoo et al. |
| 2010/0320006 | A1 | 12/2010 | Fan et al. |
| 2011/0024201 | A1 | 2/2011 | Scott et al. |
| 2011/0036643 | A1 | 2/2011 | Belnap et al. |
| 2011/0056141 | A1 | 3/2011 | Miess et al. |
| 2011/0171414 | A1 | 7/2011 | Sreshta et al. |
| 2012/0156408 | A1* | 6/2012 | Ladi ........................ C22B 3/44 |
| | | | 428/35.7 |
| 2012/0225253 | A1 | 9/2012 | DiGiovanni et al. |
| 2012/0227332 | A1 | 9/2012 | Belnap et al. |
| 2013/0001100 | A1 | 1/2013 | Thigpen et al. |
| 2013/0146368 | A1 | 6/2013 | Voronin |
| 2013/0152480 | A1 | 6/2013 | Eyre et al. |
| 2013/0167446 | A1 | 7/2013 | Lin et al. |
| 2013/0168159 | A1 | 7/2013 | Eyre et al. |
| 2013/0213433 | A1 | 8/2013 | Benin et al. |
| 2013/0340352 | A1 | 12/2013 | Eve |
| 2014/0048338 | A1 | 2/2014 | Scott |
| 2014/0134403 | A1 | 5/2014 | Gledhill |
| 2014/0238752 | A1* | 8/2014 | Bilen ....................... E21B 10/46 |
| | | | 51/307 |
| 2015/0266163 | A1* | 9/2015 | Stockey ............... B24D 18/0009 |
| | | | 51/309 |
| 2015/0285007 | A1* | 10/2015 | Stockey ................ E21B 10/567 |
| | | | 51/309 |

FOREIGN PATENT DOCUMENTS

| | | |
|---|---|---|
| CN | 203639160 | 6/2014 |
| GB | 1598837 | 9/1981 |
| JP | S53-114589 | 10/1978 |
| JP | S60-251199 | 12/1985 |
| JP | H07-048189 | 2/1995 |
| JP | 2014-069211 | 4/2014 |
| WO | 2011080685 | 7/2011 |
| WO | 2012071246 | 5/2012 |
| WO | 2012145586 | 10/2012 |
| WO | 2013098216 | 7/2013 |
| WO | 2013098217 | 7/2013 |

OTHER PUBLICATIONS

International Preliminary Report on Patentability for PCT Patent Application No. PCT/US2015/036163, dated Dec. 29, 2016; 11 pages.

Office Action for Chinese Patent Application No. 2015800244668, dated Oct. 24, 2017; 15 pages.

Office Action for Canadian Patent Application No. 2949126, dated Nov. 2, 2017; 5 pages.

Office Action for Japanese Patent Application No. 2016-568499, dated Nov. 20, 2017; 8 pages.

* cited by examiner

LASER-LEACHED POLYCRYSTALLINE DIAMOND AND LASER-LEACHING METHODS AND DEVICES

RELATED APPLICATIONS

This application is a U.S. National Stage Application of International Application No. PCT/US2015/036163 filed Jun. 17, 2015, which designates the United States, and claims priority to U.S. Provisional Application No. 62/015,219 filed Jun. 20, 2014, which are incorporated herein by reference in their entirety.

TECHNICAL FIELD

The present disclosure relates to laser-leached polycrystalline diamond (PCD), elements and drill bits containing such laser-leached PCD, methods of laser-leaching PCD, and devices for performing such methods.

BACKGROUND

Extreme temperatures and pressures are commonly encountered during earth drilling for oil extraction or mining purposes. Diamond, with its unsurpassed mechanical properties, can be the most effective material when properly used in a cutting element or abrasion-resistant contact element for use in earth drilling. Diamond is exceptionally hard, conducts heat away from the point of contact with the abrasive surface, and may provide other benefits in such conditions.

Diamond in a polycrystalline form has added toughness as compared to single-crystal diamond due to the random distribution of the diamond crystals, which avoids the particular planes of cleavage found in single-crystal diamond. Therefore, polycrystalline diamond (PCD) is frequently the preferred form of diamond in many drilling applications. A drill bit cutting element that utilizes PCD is commonly referred to as a polycrystalline diamond cutter (PDC). Accordingly, a drill bit incorporating PCD cutting elements may be referred to as a PDC bit.

PCD elements can be manufactured in a press by subjecting small grains of diamond and other starting materials to ultrahigh pressure and temperature conditions. One PCD manufacturing process involves forming a PCD table directly onto a substrate, such as a tungsten carbide substrate. The process involves placing a substrate, along with loose diamond grains mixed with a catalyst, into a container. Then the container in placed in in a pressure transferring cell and subjected to a high-temperature, high-pressure (HTHP) press cycle. The high temperature and pressure and catalyst cause the small diamond grains to form into an integral PCD table intimately bonded to the substrate. It is useful to remove the catalyst prior to use of the PCD, however, because properties of the catalyst have a negative effect in many applications, such as drilling. Thus, the PCD may be leached to remove the catalyst binder from all or part of the PCD. PCD from which a portion of the catalyst has been removed is referred to as leached PCD. A PCD from which substantially all catalyst has been leached is referred to as thermally stable polycrystalline diamond (TSP).

BRIEF DESCRIPTION OF THE DRAWINGS

A more complete understanding of the present embodiments and advantages thereof may be acquired by referring to the following description taken in conjunction with the accompanying drawings, which show particular embodiments of the current disclosure, in which like numbers refer to similar components, and in which.

DETAILED DESCRIPTION

The present disclosure relates to laser-leached PCD and elements and drill bits containing it as well as methods of laser-leaching and devices for performing such methods. Laser-leaching generally involves heating PCD that contains catalyst using a laser such that at least some catalyst is removed from the PCD.

Figure 1:
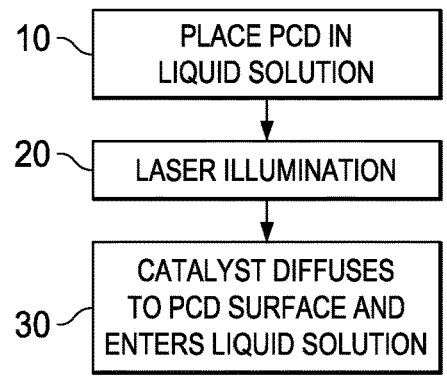
FIG. 1 illustrates a method of laser-leaching.

As shown in FIG. 1, a catalyst is selectively removed from a PCD using laser-leaching. First, in step 10 a PCD containing catalyst is placed in a liquid solution. Next, in step 20, a portion of the PCD is illuminated by a laser to a temperature sufficient to allow migration of at least one catalyst in the PCD. In one embodiment, this temperature may be above the melting point of at least one catalyst. However, catalysts may begin to migrate from the PCD at temperatures below their melting point, such that heating to lower temperatures is acceptable in other embodiments. Then, in step 30, the molten catalyst diffuses to the surface of the PCD and enters the liquid solution.

The typical catalyst may include a metal, typically Group VIII metal, such as Cobalt (Co), Nickel (Ni), or Iron (Fe), or an alloy containing a Group VIII metal. Non-metal catalysts may also be used, such as carbonate and sulfate catalysts. Either type of catalyst may be essentially a pure catalyst or it may also contain other materials able to catalyze the bonding of diamond particles under high temperature high pressure conditions.

The PCD may be unattached PCD or it may be attached to a substrate, such as a tungsten-carbide-containing substrate. One advantage of the present method is that, unlike in acid leaching, the substrate may not require special protection.

In some embodiments, the PCD may already be partially leached prior to laser-leaching. For example, if it is quicker or more cost-effective to first acid leach all or a portion of the PCD surface, this may precede laser-leaching. In another example, an amount of catalyst less than the desired amount to be removed may first be removed by acid leaching, then the remainder may be removed by laser-leaching.

The PCD may be fully immersed in the liquid solution or it may be partially immersed, such that portions of the PCD from which the catalyst is removed are immersed in the solution. The liquid solution may be selected such that it does not destroy or substantially damage the substrate during the leaching process, even if the substrate is unprotected. For example, the liquid solution may simply not react with the substrate. Alternatively, the liquid solution may be relatively unreactive with the substrate, such that, so long as the substrate is not immersed in the liquid solution, no protection is needed. In some embodiments, immersion of the substrate in the liquid solution may be avoided to help prevent leaching of catalyst from the substrate.

The liquid solution may be any liquid able to move the catalyst away from the PCD surface when it reached the PCD surface from within the PCD. In particular, it may be any liquid able to dissolve the catalyst. The liquid solution may be tailored for a particular catalyst to be removed and may selectively remove one catalyst in instances where there are multiple catalysts in the PCD or in the PCD and substrate. For example, if the PCD contains one catalyst and the substrate contains a different material, such as NiWC, CoWC, or CrWC, also usable as a catalyst, the liquid solution may be selected to preferentially remove the PCD catalyst. In some embodiments, the liquid solution may be designed to not dissolve the substrate. In some embodiments, the liquid solution may be designed to simply remove the catalyst from at or near the surface of the PCD; it may be substantially incapable of removing the catalyst from deep within the PCD as most act-leaching solutions can do. The liquid solution may not form any sort of complex with the catalyst or may simply allow catalyst ions to enter the solution.

Specifically, the liquid solution may be a polar solvent, such as an acid, or an alcohol- or water-based liquid. Much milder acids may be used than are common in chemical leaching. The liquid solution may include pure or relatively pure liquids, that become a solution as the catalyst enters them as the solute.

In some embodiments, the liquid solution may be selected to be non-toxic, not corrosive to human skin when used in this method, or environmentally benign.

The liquid solution may be at room temperature, or it may be heated. It may become heated by the laser or by the PCD. If needed, the liquid solution may be cooled during the method to prevent it from evaporating.

In some embodiments, the liquid solution may be agitated or circulated to help remove catalyst once it reaches the PCD surface by avoiding local catalyst concentration gradients within the liquid solution. For example, it may be ultrasonically agitated. The liquid solution may also be replaced during this process to avoid catalyst concentrations that hinder leaching.

The temperature to which the PCD is heated may be chosen to allow the selective removal of one or more catalysts, or to allow the removal of all catalysts. For example, it may be at or near the point at which a catalyst begins to migrate out of the PCD or at or near the melting point of a catalyst. For multiple catalysts, repeating the process at different temperatures may allow selective removal or one catalyst, if desired, or sequential removal of different catalysts. For example, the melting point of Co is around 1495° C., so a Co-containing PCD may be heated to approximately that temperature to remove Co. If Ni were present, it would also be removed because it has a melting point of around 1455° C. In one embodiment, where the goal is to remove all types of catalysts present, the PCD may be heated to approximately the melting point of the catalyst with the highest melting point. In another embodiment where the goal is similarly to remove all types of catalysts present, the PCD may be heated to a temperature sufficient to cause migration of all types of catalysts from the PCD. In another example, the temperature may be raised to the minimum to allow migration of at least one catalyst from the PCD. For instance, it may be raised to at least 340° C. to allow migration of Co.

The laser may be any energy source of short wave laser or microwave. The laser may be applied in a continuous or pulsed fashion to the PCD. It may also be directed to particular portions of the surface, allowing selective leaching. For example, a portion of the PCD may be unleached while another portion is leached. Alternatively, portions of the surface may be leached to different extents, such as different depths or with different proportions of catalyst removed.

In some embodiments, the PCD may be positioned in a system, such as that illustrated in FIG. 6 below, that allows the laser to be moved along the surface in a pre-determined pattern.

Localized application of the laser may lead to leaching of the illuminated area and also, depending on the conditions, surrounding areas. The laser may cause the diamond grains of the PCD to spontaneously heat. Diamond has a high thermal conductivity (up to 22 W/cmK), so it quickly dissipates heat to the surrounding catalyst, which then melts. In embodiments where the catalyst has already been leached from PCD surface, the diamond transfers heat to the underlying catalyst. Leaching to depths beyond those obtained with initial acid leaching may be obtained in this fashion. Further leaching of partially leached PCD may also be obtained in this fashion.

Figure 2:
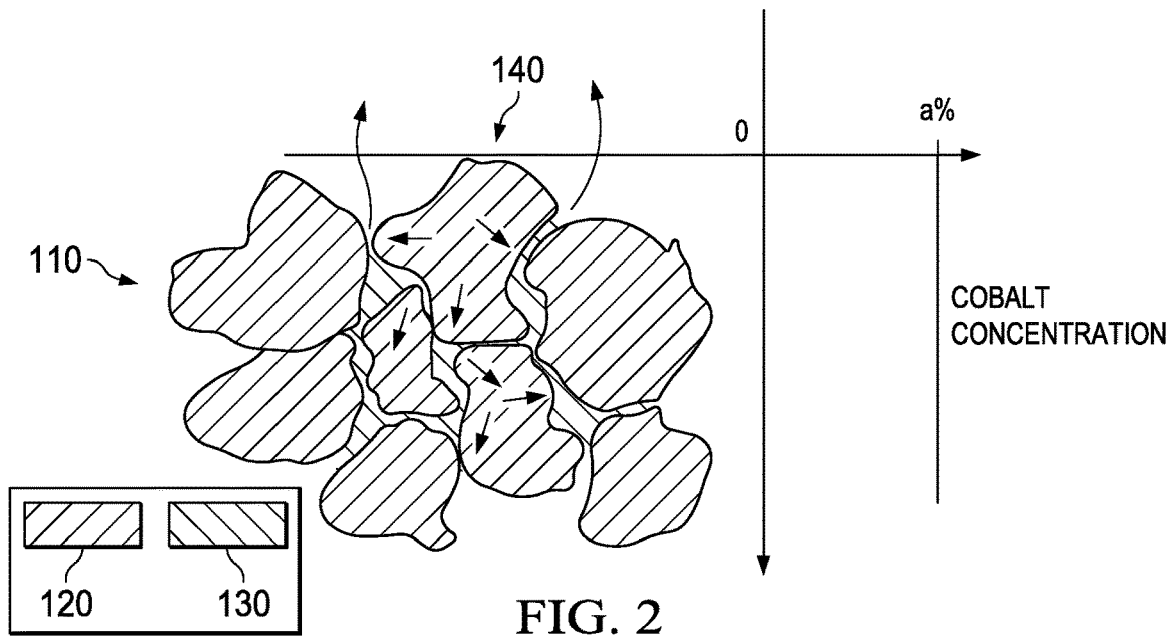
FIG. 2 illustrates a catalyst concentration gradient during laser-leaching.

The catalyst becomes mobile once it reaches a sufficient temperature or a temperature beyond its melting point and migrates or diffuses through the diamond grains to the surface of the diamond table and then enters the liquid solution due to simple concentration gradients. This concept is illustrated in FIG. 2, in which PCD 110 contains diamond grains 120 and catalyst 130. When laser 140 illuminates PCD 110, catalyst 130 moves along a concentration gradient as shown. In some embodiments, a magnetic field may also be applied to encourage movement of a metal catalyst, such as Co, out of the PCD. This may allow the use of lower temperatures during the laser-leaching process. The magnetic field may also facilitate movement during more conventional leaching, such as acid leaching, whether used alone or in combination with laser-leaching.

Using this method, all or substantially all of the catalyst may be removed from all or a portion of the PCD to produce TSP. The TSP may not crack or graphitize at temperatures up to at least 750° C. at normal atmospheric pressure. In other embodiments, a certain proportion of the catalyst may be removed from all or a portion of the PCD. For example, at least 70%, at least 80%, at least 85%, at least 90%, at least 95%, at least 98%, or at least 99% may be removed. In still other embodiments, catalyst may be removed up to a certain depth from the surface. For example, it may be removed up to at least 10 microns, at least 50 microns, at least 100 microns, at least 200 microns, at least 300 microns, at least 400 microns, at least 500 microns, at least 600 microns, at least 700 microns, at least 800 microns, at least 900 microns, or at least 100 microns from the surface. Catalyst may also be removed to no more than 10 microns, no more than 50 microns, no more than 100 microns, no more than 200 microns, no more than 300 microns, no more than 400 microns, no more than 500 microns, no more than 600 microns, no more than 700 microns, no more than 800 microns, no more than 900 or no more than 1000 microns. In another example, catalyst may be removed in a range between any of the following depths from the surface: 10 microns, 50 microns, 100 microns, 200 microns, 300 microns, 400 microns, 500 microns, 600 microns, 700 microns, 800 microns, 900 microns, and 1000 microns. In still another embodiment, catalyst may be removed to within 200 microns, 100 microns, or 50 microns of the interface between the PCD and a substrate.

Figure 3:
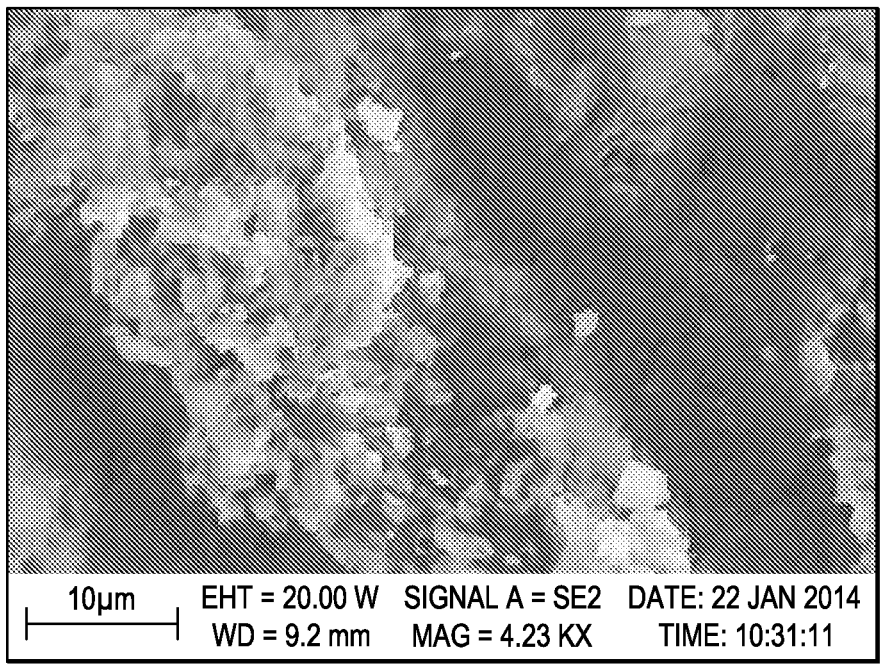
FIG. 3 illustrates laser-leached PCD prior to immersion in a liquid solution.

FIG. 3 presents a scanning electron microscope (SEM) image taken of PCD that was acid leached to at least 400 microns prior to laser-leaching. Laser-heated spots with a diameter of approximately 10 microns can be seen due to their relatively smooth finish caused by oxidation. The white element to the left of FIG. 2 was identified as cobalt oxide using Energy Dispersive Spectrometer (EDS) microscopy. This was produced when cobalt migrated to the surface and reacted with oxygen in the air and established that heat from the laser was transferred through the diamond table to a depth of at least 400 microns, where it melted the Co, which migrated to the surface.

Figure 4:
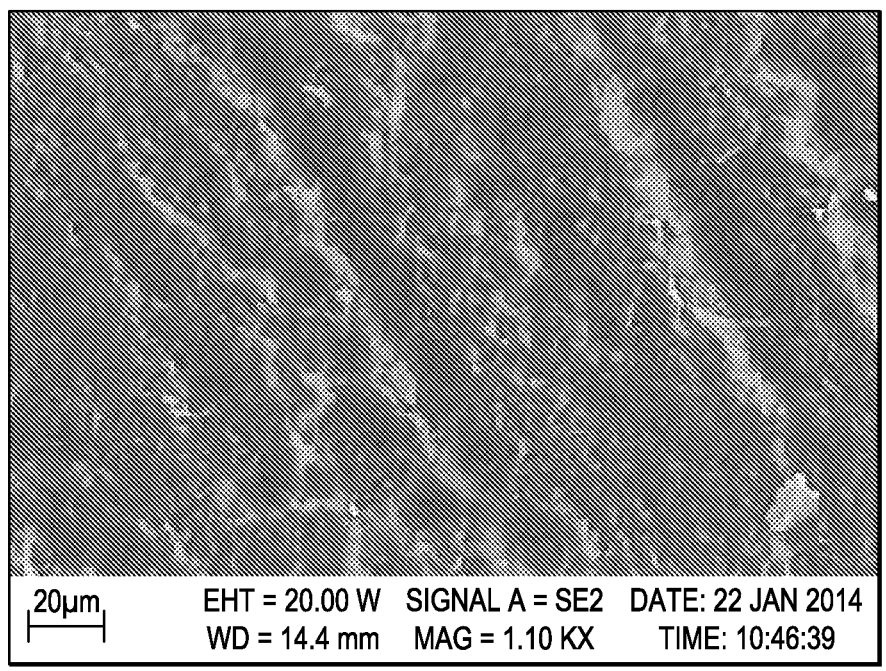
FIG. 4 illustrates the laser-leached PCD or FIG. 3 after immersion in a liquid solution.

FIG. 4 presents a SEM image of the PCD of FIG. 2 after it was subjected to ultrasonic agitation in a water-based liquid solvent. It is clear that cobalt oxide was completely or nearly completely removed from the diamond surface, which is expected due to the lack of covalent bonds between the diamond and the cobalt oxide.

Figure 5:
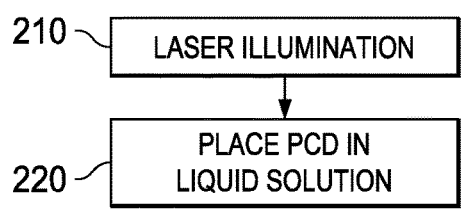
FIG. 5 illustrates another method of laser-leaching.

Although FIG. 1 illustrates placing the PCD in a liquid solution prior to heating with a laser, as the examples of FIGS. 2 and 3 make clear, it is also possible, as shown in FIG. 5, to first heat the PCD with a laser, as shown in step 210, then place it in a liquid solution, as shown in step 220. However, in order to obtain a catalyst-concentration gradient sufficient to cause the catalyst to move to the surface, in some embodiments it may be necessary to first leach some catalyst from the surface of the PCD. In this embodiment, the catalyst may reach with air to form an oxide. Or, if the laser-heating is performed under a special atmosphere, it may react with another component of the atmosphere. In some embodiments, the catalyst may form a metal boride or a metal complex. In other embodiments, once the PCD is placed in the liquid solution, the catalyst may form a complex with a component of the liquid solution.

Using either the method of FIG. 1 or FIG. 5, an optional final step to recover the catalyst from the liquid solution may be performed. In most instances, a simple pH adjustment will be sufficient to cause the catalyst to precipitate from the liquid solution as metal. Alternatively, it may be precipitated as a salt then further treated to reform metal. This allows for reuse of the catalyst. In addition, it avoids releasing toxic materials, such as Co, into the environment or avoids complicated waste-disposal procedures. In some embodiments, the laser-leaching methods disclosed herein may be used to remove catalyst from used or damaged PCD or substrate.

Figure 6A:
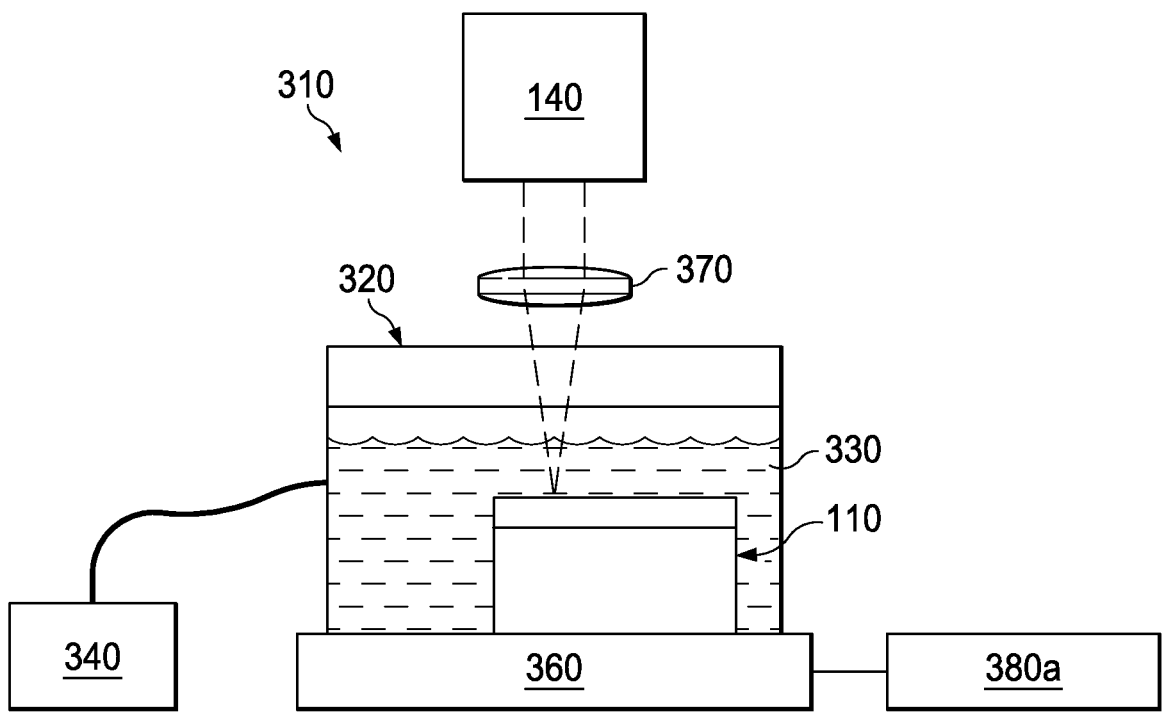
FIG. 6 illustrates a device for use in laser-leaching.
Figure 6B:
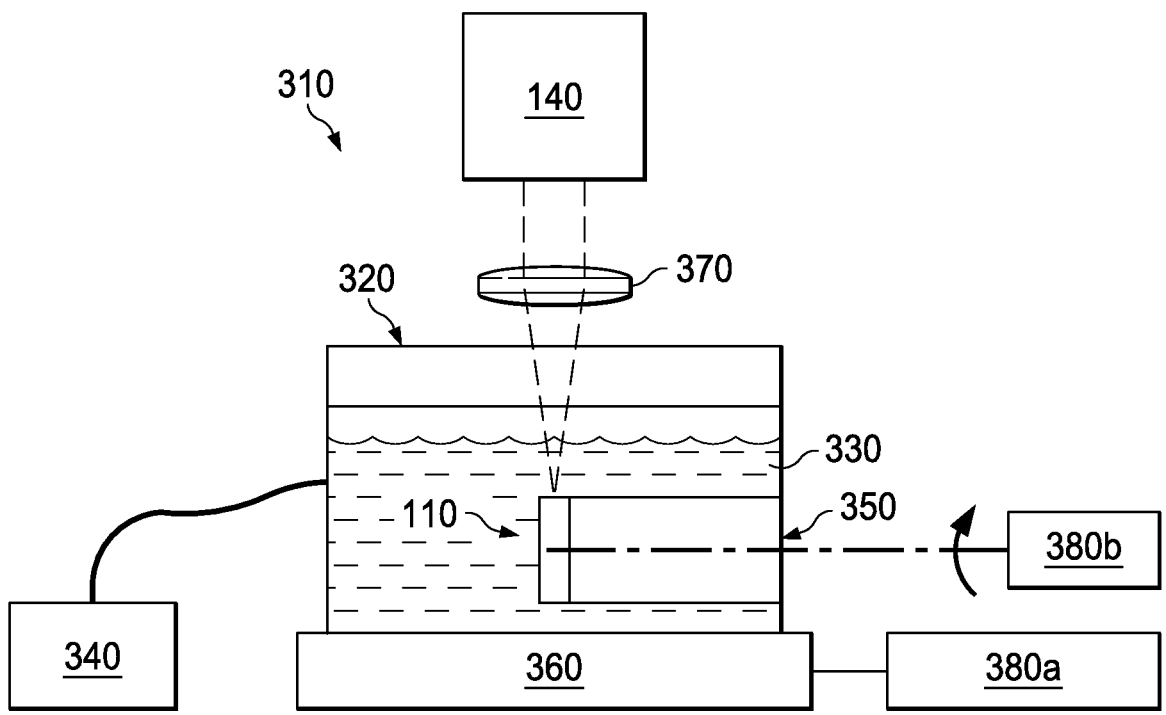

FIG. 6 illustrates a device 310 for performing laser-leaching as described herein. Device 310 includes laser 140, with focusing lens 370. Laser 140 is used to leach PCD 110, located in vat 320. Vat 320 may contain liquid solution 330, which may be present during or after illumination with laser 140, depending on the laser-leaching method used. Device 310 may optionally also contain ultrasound source 340 or another agitation device. PCD 110 may be located on X-Y translation stage 360. In some embodiments, X-Y translation stage 360 may be a micrometer translation stage that may move the cutter during laser illumination. In the embodiment illustrated in FIG. 6B, a rotational stage 350 is also present. In other embodiments, PCD 110 may remain motionless during laser illumination and instead laser 140 may move. In some embodiments, both the PCD and the laser may move. In any of these embodiments, control of the PCD or laser movement may be automated. For example, automated stage controls 380 a and b may control X-Y stage 360 and rotational stage 350, respectively. In one embodiment, X-Y stage 360 may also be rotational.

Using the device of FIG. 6, PCD 110 is submerged in liquid solution 330 with ultrasonic agitation from ultrasound source 340. Laser 140 provides a beam that passes through liquid solution 330 and is focused on a selected area of PCD 100. In FIG. 6A, the selected area is a portion of the working surface of PCD 110. In FIG. 6B, the selected area is a portion of the flank side of PCD 110. The X-Y translation stage 360 and rotational stage 350 control which areas of PCD 110 are exposed to the laser beam.

Device 310 or another device used to perform the methods of FIG. 1 or FIG. 5 may further contain a control system, which may include a processor and a memory programmed to facilitate the laser-leaching method. The control system may control movement of the laser or the PCD or both. The control system may control the duration or intensity of the laser illumination. In some embodiments, the control system may detect leaching depth and control movement of the laser or PCD or both as well as the duration or intensity of the laser illumination based on the depth to which a portion of the PCD has been leached as compared to a desired leaching depth.

Figure 7A:
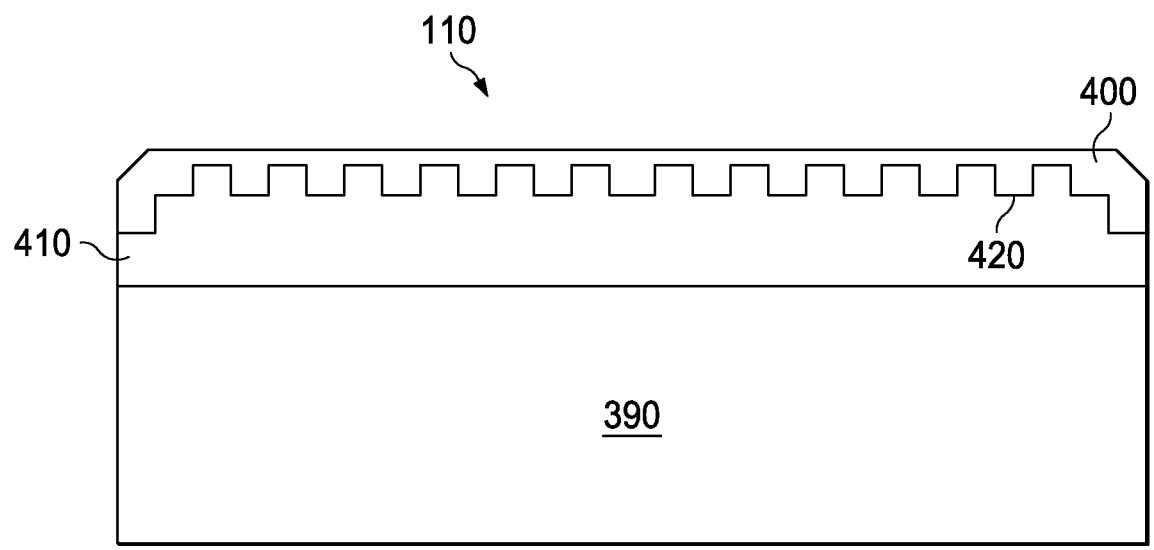
FIG. 7A illustrates an example PCD with an engineered leach boundary.
Figure 7B:
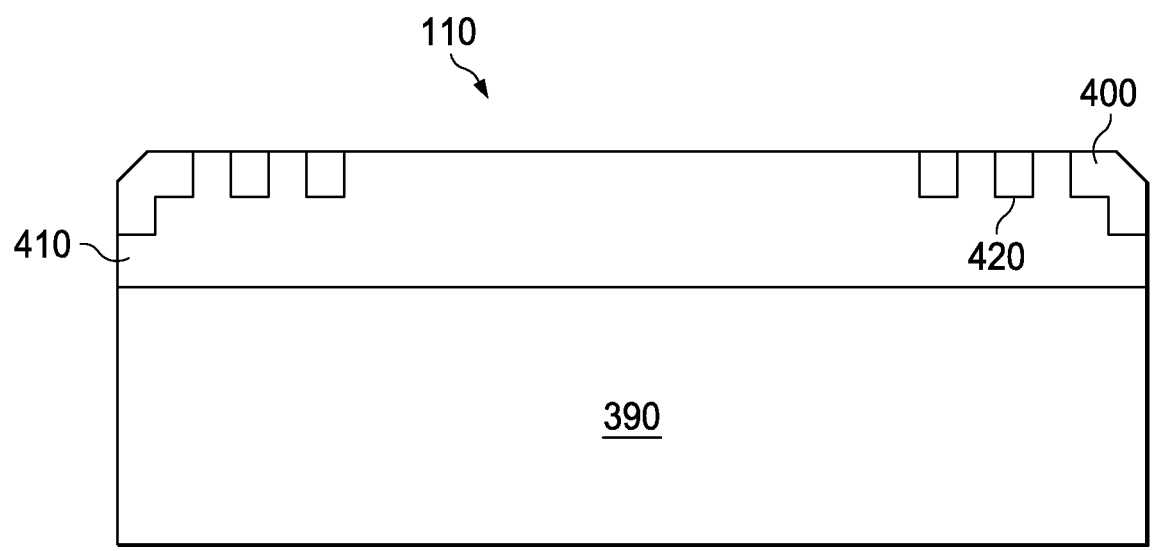
FIG. 7B illustrates an example PCD with an alternative engineered leach boundary.

In another embodiment, examples of which are shown in FIGS. 7A and 7B, PCD 110, which may be located on substrate 390, contains both a leached region 400 substantially free of at least one catalyst and an unleached region 410 substantially containing the same catalyst. An engineered leach boundary 420 is located between these two regions. Engineered leach boundary 420 is substantially non-planar. Engineered leach boundary 420 may be defined by sharp transitions in catalyst concentration as illustrated in FIG. 7A and FIG. 7B. For example, the catalyst concentration across the boundary may differ by at least 90%, at least 80%, at least 70%, at least 60%, or at least 50% over a distance of 10 microns or less, 5 microns or less, or 1 micron or less. In alternative embodiments, particularly those in which the temperature of the diamond table varies gradually from the site of illumination, the catalyst concentration may experience a diffuse transition across the engineered leach boundary. For instance, catalyst concentration across the boundary may differ by no 10% or less, 20% or less, 30% or less, or 50% or less of a distance of 5 microns or more, 10 microns or more, 20 microns or more, or 50 microns or more.

Engineered leach boundary 420 may stop or decrease propagation of a fracture in PCD 110 because a fracture in leached region 400, which is typically more brittle and likely to fracture, may stop or slow when it reaches unleached region 410. As a result, PCD 110 containing engineered leach boundary 420 may have improved impact strength or longer use life as compared to a similar PCD with a planar leach boundary.

Laser-leaching methods as described herein may be particularly well-suited to forming engineered leach boundary 420, particularly one with a sharp transition in catalyst concentration.

Processes described herein can be repeatedly applied to the same PCD, for example to sequentially remove additional catalyst. Furthermore, processes described herein may be used to leach a portion of the PCD without the need masking prior to leaching.

PCD laser-leached as described herein may be used in an element on an earth-boring drill bit, such as a cutter or a abrasion-resistant contact element.

Although only exemplary embodiments of the invention are specifically described above, it will be appreciated that modifications and variations of these examples are possible without departing from the spirit and intended scope of the invention.

The invention claimed is:

1. A method of laser-leaching a catalyst from polycrystalline diamond (PCD) comprising:
   raising the temperature of a portion of the PCD to be leached to at least a temperature at which the catalyst migrates out of the PCD by illuminating the portion of the PCD to be leached with a laser, wherein the catalyst melts and diffuses to a surface of a portion of the PCD to be leached;
   applying a magnetic field to cause movement of the catalyst out of the PCD; and
   removing the catalyst by placing the surface in a liquid solution, wherein the catalyst enters the liquid solution, resulting in a leached region of the PCD substantially free of the catalyst, an unleached region of the PCD substantially containing the catalyst, and an engineered leach boundary between the leached region and the unleached region, wherein a concentration of the catalyst across the engineered leach boundary differs by at least 50% over a distance of 10 microns or less.

2. The method of claim 1, wherein the laser comprises a short wavelength laser or microwave.

3. The method of claim 1, wherein the catalyst comprises a Group VIII metal or alloy thereof.

4. The method of claim 1, wherein the PCD is located on a substrate, which is not protected during the laser-leaching procedure.

5. The method of claim 1, wherein the PCD is exposed to air when the portion is illuminated with the laser and the catalyst forms a metal oxide at the surface.

6. The method of claim 1, wherein the liquid solution comprises a polar solvent, an acid, or water.

7. The method of claim 1, further comprising adjusting the pH of the liquid solution to precipitate the catalyst as a metal.

8. The method of claim 1, wherein the process results in removal of catalyst to a selected depth in the at least a portion of the PCD to be leached.

9. A method of laser-leaching a catalyst from polycrystalline diamond (PCD) comprising:
   raising the temperature of a portion of the PCD to be leached to at least a temperature at which the catalyst migrates out of the PCD by illuminating the portion of the PCD to be leached with a laser, wherein the catalyst melts and diffuses to a surface of a portion of the PCD to be leached;
   applying a magnetic field to cause movement of the catalyst out of the PCD; and
   removing the catalyst by placing the surface in a liquid solution, wherein the catalyst enters the liquid solution, resulting in a leached region of the PCD substantially free of the catalyst, an unleached region of the PCD substantially containing the catalyst, and an engineered leach boundary between the leached region and the unleached region, wherein a concentration of the catalyst across the engineered leach boundary differs by at least 90% over a distance of 1 micron or less.

10. The method of claim 9, wherein the laser comprises a short wavelength laser or microwave.

11. The method of claim 9, wherein the catalyst comprises a Group VIII metal or alloy thereof.

12. The method of claim 9, wherein the PCD is located on a substrate, which is not protected during the laser-leaching procedure.

13. The method of claim 9, wherein the PCD is exposed to air when the portion is illuminated with the laser and the catalyst forms a metal oxide at the surface.

14. The method of claim 9, wherein the liquid solution comprises a polar solvent, an acid, or water.

15. The method of claim 9, further comprising adjusting the pH of the liquid solution to precipitate the catalyst as a metal.

16. The method of claim 9, wherein the process results in removal of catalyst to a selected depth in the at least a portion of the PCD to be leached.

17. The method of claim 1, wherein the PCD is partially leached prior to the method of laser-leaching.

18. The method of claim 9, wherein the PCD is partially leached prior to the method of laser-leaching.

* * * * *